INVENTORS
JEROME A. BURGMAN
LESTER L. MARGASON
BY
Chisham and Spencer
ATTORNEYS

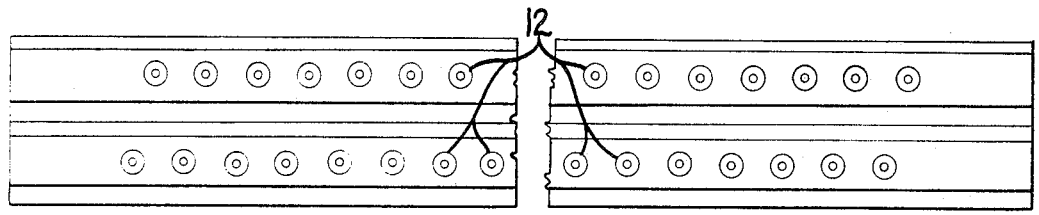
FIG. 3
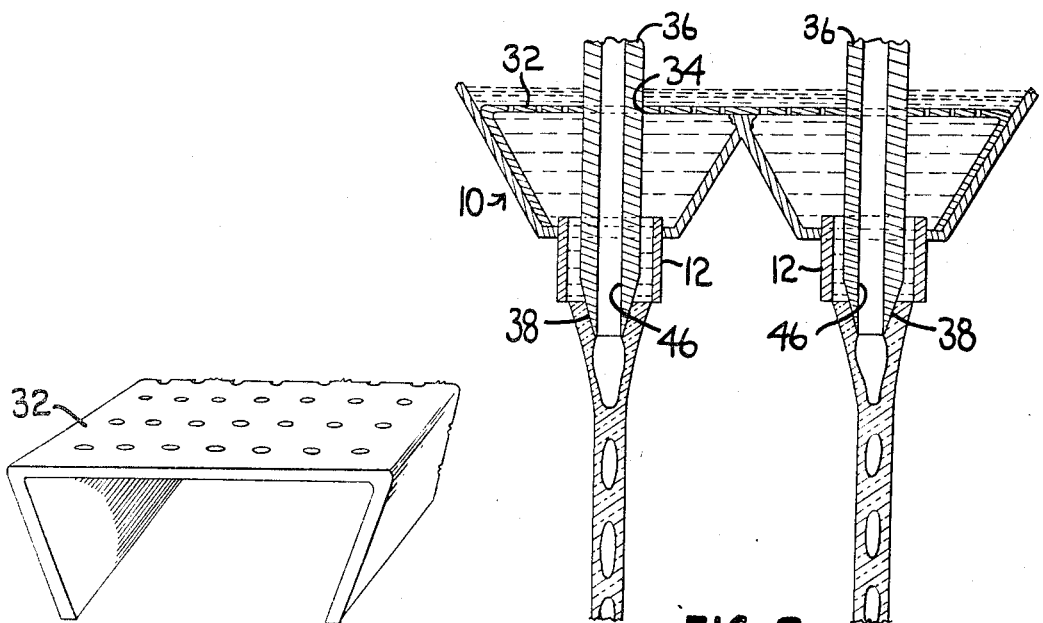
FIG. 4
FIG. 5
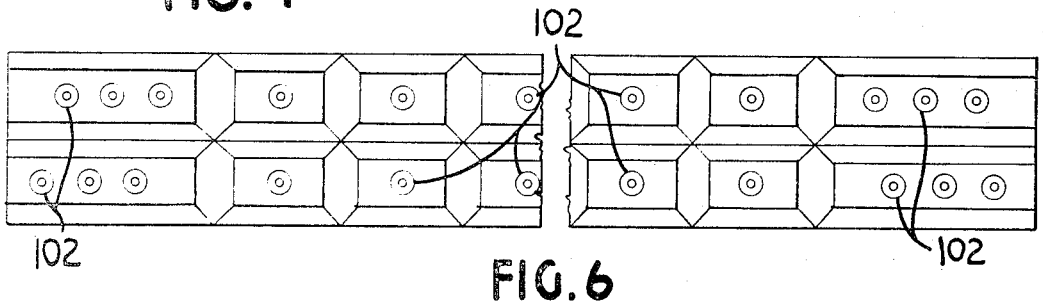
FIG. 6
INVENTORS
JEROME A. BURGMAN
LESTER L. MARGASON United States Patent Office 3,421,873
Patented Jan. 14, 1969

3,421,873
METHOD AND APPARATUS FOR PRODUCING AN INTERMITTENTLY HOLLOW GLASS FILAMENT
Jerome A. Burgman, 572 Idlewood Road, Pittsburgh, Pa. 15235, and Lester L. Margason, R.R. 1, Cheswick, Pa. 15024
Filed Mar. 17, 1966, Ser. No. 535,057
U.S. Cl. 65—1
Int. Cl. C03b 37/00
2 Claims This application relates to the production of glass fibers and more specifically to the production of glass fibers which are intermittently hollow and intermittently solid.

The usual glass fiber is solid in section and is drawn from a source of molten glass through an orifice in the bushing plate known as a tip. In the modern process, as many as 800 fibers are drawn at the same time from closely spaced tips of a bushing. These fibers are generally gathered into a strand and collected onto a forming tube. A binder is usually applied to the group of fibers to retain them in the strand configuration.

It is to be remembered that each fiber in a strand will be substantially uniform in diameter and that fibers for strand forming are drawn which vary from 0.00003 inch to .00080 inch in diameter. Primary fibers for blown products, i.e., where the primary fiber is subjected to a hot gaseous blast and collected as a mat, are generally of larger diameters.

Much consideration has been given to the concept of retaining the strength of the cross-sectional area of the fibers while reducing the weight of the composite in which the fiber is used. Hollow fibers and partially hollow fibers, for example, those which are intermittently hollow and intermittently solid meet this requirement. In filament wound applications, where a continuous filament is wrapped or wound about a mandrel, a high glass to resin ratio is obtainable and desirable. Filament wound composites insure high strength in a relatively lightweight object. Filament wound applications include the manufacture of rocket motor cases, hydro-space vehicle bodies, large storage tanks, radar domes, and other housings of similar size and nature. Substantially the same rigidity can be obtained with reduction in weight by substituting partially hollow fibers for solid fibers in such applications.

The production of a plurality of intermittently hollow and intermittently solid fibers each of substantial uniformity has been successfully accomplished by using the apparatus to be herein described. In the apparatus, a bushing is provided with a plurality of tips through which glass flows as streams to be attenuated by winding means which applies a tractive force to the streams, so as to attenuate the streams into filaments. A tube having a tapered terminal end and being connected to a source of pressurized gas is concentrically located within each tip. Simultaneously with the passage of glass through each tip and around the concentric tube, pressurized gas is intermittently discharged through each tube into the interior of the glass stream at a predetermined distance from the terminal end of the tip, so as to produce a stream of glass having hollow portions which is attenuated into a filament of intermittent hollow and intermittent solid configuration. The drawn filaments are grouped into a strand and the strand is collected onto a forming tube in a conventional manner. Each filament so produced has substantially the same diameter and the wall thickness of each hollow portion of each fiber is substantially uniform.

To further understand the inventive features, attention is directed to the accompanying drawings, in which:

FIG. 3 is a bottom view of the bushing shown in FIG. 1 and particularly illustrating the multiple tips;

FIG. 4 is a perspective view of a perforated sheet used in the bushing of FIG. 1;

FIG. 5 is an enlarged sectional view of adjacent tips of the bushing of FIG. 1 and also showing a portion of the fiber so produced, and FIG. 6 is a bottom view similar to FIG. 3 showing a modification in the bushing and tip arrangements;

Figure 1:
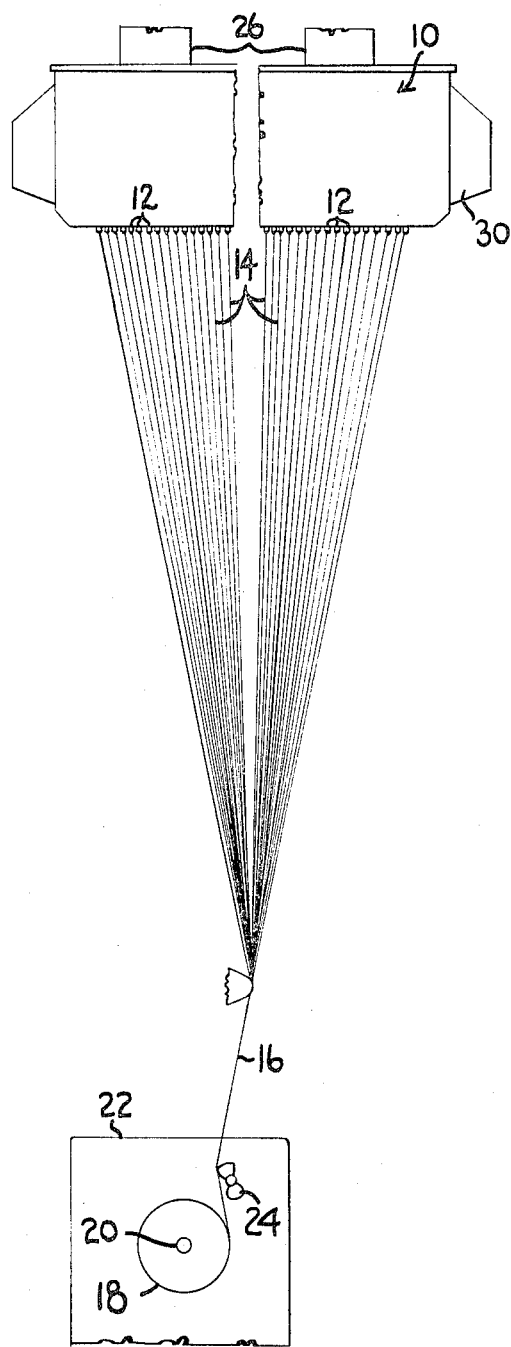
FIG. 1 is a side view of an apparatus for drawing a plurality of intermittently hollow fibers and particularly illustrating a bushing made in accordance with this invention.
Figure 2:
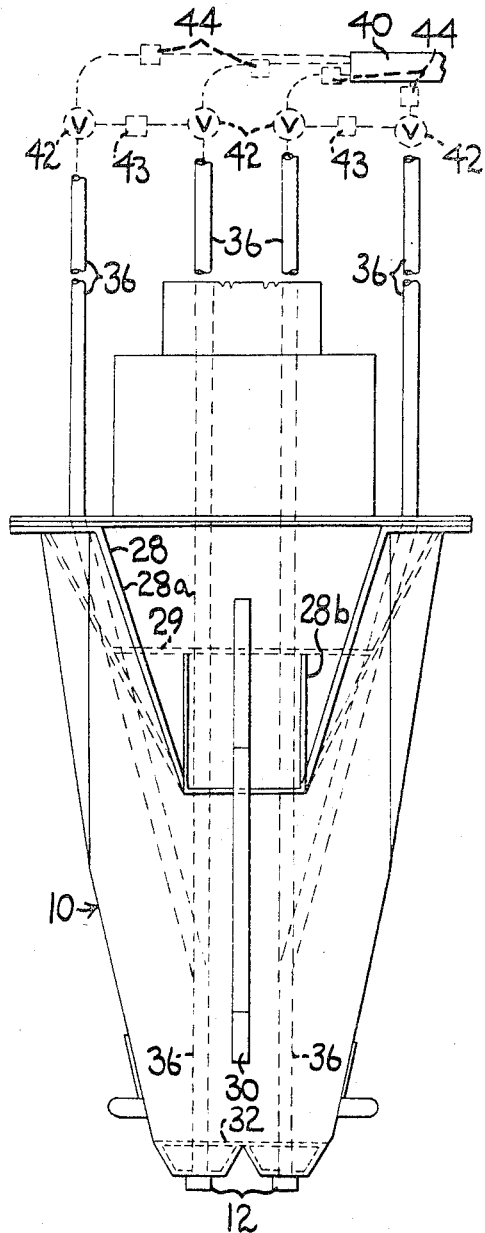
FIG. 2 is an enlarged end view of the bushing shown in FIG. 1.

Referring now to the drawings, especially FIG. 1, there is illustrated an arrangement for simultaneously drawing a plurality of intermittently hollow fibers, which arrangement includes a marble-melt bushing 10 having a plurality of tips 12 at its bottom through which streams of glass issue to be attenuated into fibers 14. The tips 12 are tubular members welded to openings in the bottom of the bushing so as to extend downwardly from the bushing. The fibers 14 are grouped into a strand 16 which is wound on a forming tube 18 received on a rotating mandrel 20 of a winding apparatus 22. The tractive force to attenuate the streams of glass into the fibers 14 is supplied by the winding apparatus 22. To distribute the strand 16 over the length of the forming tube 18, a traverse 24 is employed. This traverse 24 may be similar to that described and claimed in the United States Letters Patent to Beach, No. 2,391,870, issued Jan. 1, 1946. The traverse 24 may also be moved relative to and laterally of the mandrel 20 or the mandrel 20 may be moved relative to and laterally of the traverse 24 in order to use relatively long forming tubes 18 and collect a substantial quantity of strand.

The bushing 10 has a pair of upstanding feed tubes 26 through which marbles of glass of the desired composition are fed. Automatic mechanism for feeding the marbles in predetermined time sequence or in response to glass level may be employed if found necessary or desirable. Because such feed mechanisms are well known in the art and form no part of this invention, a description of their details is not considered necessary.

A heater basket 28 is located within the bushing and is constructed of perforated sheet material 28a, such as a sheet having 100 holes per square inch, each on the order of 0.070 inch in diameter, heater strips 28b and heater strip support wires 29 welded to the sides of the basket. The basket 28 is welded to the ends of the bushing. Lugs 30, 30 are welded to the ends of the bushing and extend therefrom. These lugs 30, 30 are connected by conventional means to a source of electrical power (not shown) which furnishes the power to energize the basket and supply heat to the bushing to melt the marbles fed to the bushing. The basket effectively divides the bushing into a melting zone and a refining zone and, because of its perforated construction permits passage of glass from one zone to another without the passage of large, connected pieces of marbles.

Below the heater basket 28 is a perforated plate 32 having openings 34 aligned with the tips 12 (see also FIGS. 4 and 5). The plate 32 has depending sides which abut the sides of the bushing closely adjacent the tips.

A tube 36 having a conical end 38 is received in each plate opening 34 with a portion within and concentric to a tip 12. The plate 32 serves to maintain the tubes properly aligned with their respective tips. The other terminal end of each tube 36 extends to a location above the surface of the glass in the bushing and is connected to a supply of gas, under a pressure above atmospheric, indicated at 40. A valve 42, as well as a pressure regulating means 44, is in the connecting line to control the gas supply to each tube 36. The valve 42 is capable of being actuated by mechanical or electrical means, schematically noted at 43, so as to instantaneously interrupt the supply of gas to the tube 36, so as to produce the desired product.

The molten glass flows through the annulus defined by the tips 12 and the tube 36 as a stream. An intermittent supply of gas is supplied through the bore 46 of the tube 36 and insures a partial hollow configuration fiber being produced from the glass stream. The concentricity of the tube 36 and the tip 12 coupled with controlled pressure gas, and uniform attenuating force assures the production of uniform diameter fibers having substantially constant thickness walls in their hollow portions. The ratio and extent of hollow portion to solid portion depends upon the manner in which the valve 42 is operated.

As will be noted and illustrated in FIG. 6, the tips 12 of the bushing above described are arranged in two rows, slightly separated from one another with the tips of one row offset longitudinally with respect to those in the other row, so as to insure fiber separation and thus cooling until the fibers are grouped as a strand.

Attention is now directed to FIG. 6 showing a modified bushing form. The bushing 100 is a marble-melt bushing used in the same fiber drawing arrangement illustrated in FIG. 1. The bushing 100 has a plurality of tubular tips 102 at its bottom through which streams of glass issue to be attenuated into fibers which fibers are grouped as a strand and wound on a forming tube of a winding apparatus.

The bushing 100 is constructed in the same manner as the bushing 10 with the exception of tip arrangement and thus requires little further description except for that of tip arrangement.

The tips 102 of the bushing 100 are arranged in a slightly different manner than the tips 12 previously described. In this embodiment there are three longitudinal sections of two rows with the tips again offset in each row from those in the other row. This arrangement is well shown in FIG. 6 which also indicates constructional details of the bushing 100 in that there are portions which appear to be notched, but are in reality zones where various sub-assemblies are joined together to form the whole. More rigidity is given to the assembly by this procedure which further insures alignment of the hollow tubes concentrically within the tips 102.

By varying the rate of attenuation, air pressure and the size of the orifice tip uniform diameter fibers of 0.00030 inch to 0.003 inch outside diameter (O.D.) can be produced.

As a specific example hollow fibers having an outside diameter of 0.00050 inch and a hollow portion with an inside diameter of 0.00032 inch (walls of 0.00009 inch thickness) have been successfully produced using a bushing as illustrated in FIGS. 1-5. This bushing produced 50 filaments which were gathered into a strand by conventional winding apparatus, as illustrated. A silane size as disclosed in copending United States application Ser. No. 79,031, filed Dec. 28, 1960, now U.S. Patent No. 3,168,389 was applied to the filaments prior to being grouped into the strand. Each tip 12 of the bushing 10 had a length of 0.1875 inch and an inner diameter of 0.130 inch.

The tube 36 was concentrically located with the tip and was constructed with an outer diameter of 0.062 inch and an inner diameter of 0.020 inch. The end 38 of each tube was provided with a 12 degree taper extended 0.060 inch below the terminal end of the tip 12, optimum fibers were produced.

A pressure differential up to 15 inches of water can exist between the atmosphere within the tube 36 and thus the fibers being produced and the surrounding atmosphere.

We claim:

1. Apparatus for producing intermittent hollow and solid fibers comprising a source of molten glass, a bushing having a plurality of orifices therethrough for the passage of streams of glass from said source, a plurality of hollow tubes each extending into an orifice and being arranged substantially concentrically with its respective orifices, each tube extending beyond the terminus of its respective orifice and restricting its respective orifice to an annulus, a source of gas, means connecting each hollow tube to said gas source for discharge through each tube and into a central area of a glass stream, means to intermittently supply gas to each tube so as to form intermittently hollow glass streams, and means to attenuate said streams of glass into fibers.

2. A method for producing an intermittently hollow and intermittently solid fiber of heat softenable material from a source of such molten material which includes the steps of feeding a stream of said material from said source through a terminus of said source, intermittently flowing a gas into the central area of said stream, and cooling said stream to produce an intermittently hollow and intermittently solid fiber.

References Cited

UNITED STATES PATENTS

| 1,990,434 | 2/1935 | Kohler | 161—178 |
| 2,903,387 | 9/1959 | Wade. | |
| 3,046,178 | 7/1962 | Tupper | 161—178 X |
| 3,121,254 | 2/1964 | Heynen et al. | |
| 3,226,285 | 12/1965 | Iovenko | 161—178 |
| 3,268,313 | 8/1966 | Burgman et al. | 65—2 XR |
| 3,282,667 | 11/1966 | Stalego et al. | 65—86 XR |

S. LEON BASHORE, *Primary Examiner.*

ROBERT L. LINDSAY, JR., *Assistant Examiner.*

U.S. Cl. X.R.

65—2, 86, 192; 161—178